United States Patent Office 3,316,185
Patented Apr. 25, 1967

3,316,185
CURABLE POLYEPOXIDE COMPOSITIONS
CONTAINING A GLYCOL DIAMINE
Norman H. Reinking, Millington, N.J., assignor to Union
Carbide Corporation, a corporation of New York
No Drawing. Filed Nov. 21, 1960, Ser. No. 70,446
12 Claims. (Cl. 260—2)

This invention relates to curable polyepoxide compositions and cured products obtained therefrom. More specifically, this invention relates to curable polyepoxide compositions containing as the curing agent a liquid glycol diamine which have particular utility for use as protective coatings on metal, concrete, plastic, and other similar type surfaces.

Polyepoxide coating compositions generally contain curing agents which cure the compositions to a hard, tough, infusible state after application of the compositions to the desired surface. It has been found, however, that polyepoxide compositions containing conventional curing agents such as diethylene triamine and triethylene tetramine, upon curing, are characterized by poor impact strength and poor flexibility. Consequently, it has been necessary to add to these polyepoxide coating compositions materials which are designed to improve the impact strength and flexibility of the compositions once they are cured. Illustrative of materials which have been commonly added to polyepoxide coating compositions in order to improve the impact strength and flexibility of the compositions, once cured, are the polysulfides, and the polyamides.

The "impact strength improvers" and the "flexibilizers" particularly of the type described have proved to be undesirable for use as additives to polyepoxide compositions as they impart to these compositions a disagreeable odor, an undesirable dark color, and undesirably increase the viscosity of the compositions. In addition, these materials tend to interfere with the curing mechanism involving the polyepoxides and curing agents, considerably increasing the amount of curing agent required in order to cure the polyepoxide compositions to a hard, tough, infusible state.

The polyepoxide compositions of the present invention, once cured, have excellent impact strength and excellent flexibility. Thus, they do not require any "impact strength improvers" and/or "flexibilizers." Since no additives need be incorporated into the compositions of the present invention for purposes of improving their impact strength and flexibility, there is no possibility of affecting the curing mechanism between the polyepoxides and the curing agents. Furthermore, the cured products of the polyepoxide compositions of this invention, in addition to possessing excellent impact strength and excellent flexibility, are of a desirable light color and have no undesirable odor.

The compositions of this invention comprise a curable mixture of a polyepoxide having an epoxy equivalency of greater than one and a liquid glycol diamine having the general formula:

$$H_2N(CH_2)_3O(C_nH_{2n}O)_x(CH_2)_3NH_2$$

wherein $n$ has a value of 2 to 5 inclusive and $x$ has a value of 1 to 11 inclusive. For example, suitable liquid glycol diamines are those wherein when $n$ has a value of 2, $x$ has a value of 11, and when $n$ has a value of 5, $x$ has a value of 7. The liquid glycol diamines have a molecular weight of less than about 800.

Particularly desirable glycol diamines are those wherein $n$ in the formula previously noted has a value of from 2 to 3 inclusive and wherein $x$ has a value of 1 to 3 inclusive. Such glycol diamines are extremely compatible with polyepoxides forming homogenous mixtures therewith. These mixtures, when applied as coatings and cured, form coatings of excellent quality and smoothness. Furthermore, the glycol diamines having the formula previously noted, wherein $n$ has a value of 2 to 3 inclusive, and $x$ has a value of 1 to 3 inclusive are very reactive with polyepoxides. Thus polyepoxide compositions containing these glycol diamines cure in relatively short periods of time as compared to polyepoxide compositions containing other glycol diamines of the series. Another advantageous feature of these glycol diamines is that on addition to polyepoxides they form compositions of relatively low viscosity. These relatively low viscosity polyepoxide compositions are capable of tolerating greater amounts of filler than the higher viscosity compositions formed on adding to polyepoxides glycol diamines having the formula previously noted wherein $n$ has a value of 4 to 5 inclusive and $x$ has a value of 4 to 11 inclusive; and are also free of entrapped air. The presence of entrapped air in polyepoxide compositions is undesirable as cured coatings produced therefrom tend to flake off from the surface to which they have been applied at areas where entrapped air was present.

In addition to the advantageous properties described polyepoxide compositions containing glycol diamines having the formula noted wherein $n$ has a value of 3 and $x$ has a value of 1 to 3 inclusive are also desirable as they cure in an atmosphere of high humidity, i.e., about 80 percent to about 100 percent, without becoming cloudy or hazy in appearance.

The liquid glycol diamines which are used as the curing agents for polyepoxide compositions can be conveniently prepared by cyanoalkylating a glycol having the general formula:

$$HO(C_nH_{2n}O)_xH$$

wherein $n$ and $x$ are as previously defined, by reacting the glycol with at least two moles of acrylonitrile per mole of the glycol at a temperature of from about 20° C. to about 60° C. and in the presence of an alkali metal alkoxide such as sodium methoxide to form the corresponding cyanoalkylated compound. The cyanoalkylated compound is then hydrogenated at a temperature in the range of from about 95° C. to about 100° C. in the presence of nickel as a catalyst and at pressures on the order of about 1500 p.s.i.g. Suitable glycols having the formula previously given which can be cyanoalkylated with acrylonitrile include, among others, ethylene glycol, diethylene glycol, 1,2-propylene glycol, 1,3-propylene glycol, 1,4-butylene glycol, and the like. Illustrative of specific liquid glycol diamines suitable for purposes of this invention are di-(3-aminopropyl) ether of ethylene glycol, di-(3-aminopropyl) ether of 1,2-propylene glycol, di-(3-aminopropyl) ether of diethylene glycol, di-(3-aminopropyl) ether of triethylene glycol, di-(3-aminopropyl) ether of dipropylene glycol, and the like.

Various amounts of the liquid glycol diamines can be used to cure the polyepoxides to a hard, tough, infusible state. Amounts used generally range from about 90 percent of stoichiometric to about 10 percent in excess of stoichiometric. Optimum properties in cured polyepoxide compositions are achieved using a stoichiometric amount of the liquid glycol diamine. For purposes of stoichiometric calculations, one epoxy group:

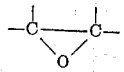

is deemed to react with one amino hydrogen.

The curing reaction involving the liquid glycol diamines and the polyepoxides occurs when the desired diamine and polyepoxide are simply admixed together. The curing reaction occurs slowly at temperatures on the order of about 10° C. Generally, the mixture is heated to temeratures in the range of about 20° C. to about 200° C. Temperatures which are particularly preferred are in the range of about 20° C. to about 150° C.

In those instances wherein the polyepoxide is a relatively low viscosity liquid, it is admixed directly with the diamine. Polyepoxides which are too viscous for ready mixing with the diamines can be heated to reduce their viscosity or liquid solvents can be added thereto in order to provide the desired fluidity. Normally solid polyepoxides are either melted or mixed with liquid solvents.

Suitable solvents for imparting the desired fluidity to highly viscous or normally solid polyepoxides are ketones, such as acetone, methyl isobutyl ketone, isophorone, and the like; esters, such as ethyl acetate, butyl acetate, ethylene glycol monoacetate, acetate of ethylene glycol monomethyl ether, and the like; ether alcohols, such as the methyl, ethyl, and butyl ether of ethylene glycol or of diethylene glycol; chlorinated hydrocarbons, such as trichloropropane, chloroform, and the like. Also suitable in admixture with the solvents noted are the aromatic hydrocarbons, such as benzene, toluene, xylene, and the like; alcohols, such as ethyl alcohol, isopropyl alcohol, n-butyl alcohol, and the like. The actual amount of solvent used will depend upon the polyepoxide being employed. If desired, rather than using solvents of the type described, or in addition thereto, reactive liquid diluents, containing a single epoxy group:

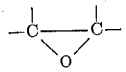

can be used in order to achieve the desired fluidity in the polyepoxide. Among such suitable reactive liquid diluents are butyl glycidyl ether, allyl glycidyl ether, phenyl glycidyl ether, and the like. In determining stoichiometric amounts with respect to the glycol diamines, the presence of "reactive" diluents is taken into account.

Additional materials, such as fillers, pigments, fibers, dyes, plasticizers, and the like can be added either to the polyepoxides or to the diamines, if desired.

The polyepoxides which can be cured with the liquid glycol diamines are those organic compounds having an epoxy equivalency of greater than one, that is, compounds having an average of more than one epoxy group, i.e.,

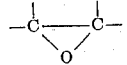

per molecule. These compounds wherein the oxygen of the epoxy group is attached to vicinal carbon atoms can be saturated or unsaturated, aliphatic, cycloaliphatic, or heterocyclic, and can be substituted, with substituents such as halogen atoms, hydroxyl groups, ether groups, and the like.

In further explanation of the term "epoxy equivalency" as used in this specification, it refers to the average number of epoxy groups contained in the average polyepoxide molecule. This value is obtained by dividing the molecular weight of the polyepoxide by its calculated epoxide weight. The epoxide equivalent weight is determined by heating a one gram sample of the polyepoxide with an excess of pyridinium chloride which is dissolved in pyridine. The excess pyridinium chloride is then back titrated with 0.1 N sodium hydroxide to an end point using phenolphthalein as the indicator. The epoxide equivalent weight is calculated by considering that one HCl molecule is equivalent to one epoxide group. If the polyepoxide is a single compound and all of its epoxy groups are intact, the epoxy equivalency values will be integers of whole numbers, such as 2, 3, 4, and the like. In those instances wherein the polyepoxide is a mixture of polyepoxides or contains some monomeric monoepoxides or where the polyepoxide has some of its epoxy groups hydrated or otherwise reacted, the epoxy equivalency values may contain fractions, such as 1.2, 1.5, 2.8, and the like.

Illustrative of polyepoxides which can be cured with the liquid glycol diamines are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. 2,506,486 and polyphenylols such as the novolak condensation product of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. 2,885,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U.S. 2,506,486). The polyhydric polynuclear phenols can consist of two or more phenols connected by such groups as methylene, alkylene, or sulfone. The connecting groups are further exemplified by bis(4-hydroxyphenyl)methane, bis(4-hydroxyphenyl)dimethylmethane, and dihydroxydiphenyl sulfone.

Process for the preparation of polyglycidyl ethers of polyhydric phenols is described in detail in the Bender et al. patent supra and U.S. 2,801,989 to A. G. Farnham. Among the more common polyglycidyl ethers of polyhydric phenols are polyglycidyl ether of 2,2-bis(p-hdroxyphenyl)propane and polyglycidyl ether of bis(p-hydroxyphenyl)methane. Other suitable polyglycidyl ethers of polyhydric phenols are enumerated in U.S. 2,633,458.

Also suitable are the polyglycidyl ethers of polyhydric alcohols, such as the reaction products of epichlorohydrin and polyhydric alcohols for example, aliphatic compounds containing from two to four alcoholic hydroxyl groups, such as ethylene glycol, propane diols, butane diols, glycerine, hexane triols, and the like. (Methods of preparing polyglycidyl ethers of polyhydric alcohols are described in U.S. 2,898,349 to P. Zuppinger et al.)

Other suitable polyglycidyl compounds are the polyglycidyl esters of polycarboxylic acids, such as the polyglycidyl esters of adipic acid, phthalic acid, and the like. Polyglycidyl esters of polycarboxylic acids are described in detail in U.S. 2,870,170 to Payne et al. Also suitable are polyglycidyl compounds produced by reacting epichlorohydrin with aromatic amines, such as aniline, 2,6-dimethyl aniline, p-toluidine, m-chloraniline, p-aminodiphenyl, m-phenylene diamine, p-phenylene diamine, 4,4'-diaminodiphenyl methane, or with amino phenols such as p-amino phenol, 5-amino-1-naphthol, 4-amino resorcinol, 2-methyl-4-amino phenol, 2-chloro-4-aminophenol, and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups. Polyglycidyl derivatives of aromatic amines and amino phenols and methods for their preparation are further described in U.S. Patents Nos. 2,951,822 and 2,951,825 to N. H. Reinking and to N. H. Reinking et al., respectively. The so-called peracetic acid epoxides which are obtained by epoxidation across a double bond using peracetic acid, such as bis-(2,3-epoxycyclopentyl)ether and the like are also suitable.

It is to be understood that all patents and literature references referred to in this specification are incorporated herein by reference.

The following examples further illustrate the present invention and are not intended to limit the scope thereof in any manner.

EXAMPLE 1

One hundred grams of a diglycidyl ether of 2,2-bis-(p-hydroxyphenyl)propane having an epoxy equivalency of two and an epoxide equivalent weight of 187 were thoroughly admixed with 29.4 grams (a stoichiometric amount) of di-(3-aminopropyl) ether of diethylene glycol having the formula:

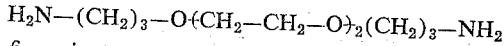

for five minutes. A portion of this mix was used to coat two cold rolled, 0.012 inch thick steel panels using a draw down blade having a clearance of 10 mils. The coatings were cured by allowing the coated panels to stand for seven days at room temperature, about 25° C. The cured coatings were 6 mils thick. The coating on each panel was tested for impact strength and flexibility.

The impact strength of each coating was such that neither coating cracked or lost adhesion on being struck with 130 inch pounds of impact using a Gardner 160 inch pound Variable Impact Tester. Each coating was sufficiently flexible so that on bending each coated panel with its coated side up 180° over a ⅛ inch diameter steel mandrel, the coatings did not crack or lose adhesion to the steel panel.

EXAMPLE 2

One hundred grams of a diglycidyl ether of 2,2-bis-(p-hydroxyphenyl)propane having an epoxy equivalency of two and an epoxide equivalent weight of 187 were thoroughly admixed with 26.5 grams (90 percent of stoichiometric) of di-(3-aminopropyl) ether of diethylene glycol for five minutes. A portion of this mix was used to coat two cold rolled, 0.012 inch thick steel panels using a draw down blade having a clearance of 10 mils. The coatings were cured by allowing the coated panels to stand for seven days at room temperature, about 25° C. The cured coatings were 6 mils thick. The coating on each panel was tested for flexibility by bending each coated panel around a steel mandrel. Each coating was sufficiently flexible so that on bending each coated panel 180° around a ⅛ inch mandrel, the coatings did not crack or lose adhesion to the steel panel.

EXAMPLE 3

The procedure of Example 2 was repeated using the same material and in the same amounts noted in Example 2 with the exception that 32.3 grams (110 percent of stoichiometric) of the diamine was used. Coatings, applied and cured as also described in Example 2, were sufficiently flexible so that upon bending the coated panels 180° over a ⅛ inch diameter steel mandrel the coatings did not crack or lose adhesion.

EXAMPLE 4

One hundred grams of a diglycidyl ether of 2,2-bis-(p-hydroxyphenyl)propane having an epoxy equivalency of two and an epoxide equivalent weight of 187 were thoroughly admixed with 23.5 grams (a stoichiometric amount) of di-(3-aminopropyl) ether of ethylene glycol having the formula $$H_2N-(CH_2)_3-O(CH_2)_2-O(CH_2)_3-NH_2$$

for five minutes. A portion of this mix was used to coat two cold roller, 0.012 inch thick steel panels using a draw down blade having a clearance of 10 mils. The coatings were cured by allowing the coated panels to stand for seven days at room temperature, about 25° C. The cured coatings were 6 mils thick. The coating on each panel was tested for impact strength and flexibility.

The impact strength of the coatings was such that neither coating cracked or lost adhesion on being struck with 60 inch pounds of impact using a Gardner 160 inch pound Variable Impact Tester. Each coating was sufficiently flexible so that on bending each coated panel 180° over a ½ inch diameter mandrel, the coatings did not crack or lose adhesion to the steel panel.

EXAMPLE 5

Ninety-one grams of bis-(2,3-epoxycyclopentyl) ether were admixed with 55 grams (a stoichiometric amount) of di-(3-aminopropyl) ether of diethylene glycol and the mixture cast into a shallow aluminum dish. The casting was cured by heating for 12 hours at 85° C. and then by heating for six hours at a temperature ranging from about 130° C.–160° C. A tough, hard casting was obtained which did not crack on being struck with 130 inch pounds of impact using a Gardner 160 inch pound Variable Impact Tester.

To clearly demonstrate the excellent impact strength and excellent flexibility of the compositions of the present invention, Example 1 was repeated and two compositions, Control 1 and Control 2 were prepared, using the same procedures and using the same materials in the same relative (molar) proportions with the exception that diethylene triamine (Control 1) and triethyl tetramine (Control 2) were used in lieu of the di-(3-aminopropyl) ether of diethylene glycol. Portions of each composition were used to coat steel panels and cured, also in a manner described in Example 1. Coatings of both Control 1 and Control 2 cracked and lost adhesion on being struck with 4 inch pounds of impact using a Gardner 160 inch pound Variable Impact Tester. Also, coatings of both compositions, Control 1 and Control 2, lost adhesion and cracked upon bending the coated panels 180° over a one inch diameter steel mandrel.

EXAMPLE 6

One hundred and ten grams of diglycidyl ether of 2,2-bis(p-hydroxyphenyl)propane having an epoxide equivalent weight of 196.5 were thoroughly admixed with 37 grams (a stoichiometric amount) of di-(3-aminopropyl) ether of triethylene glycol having the formula:

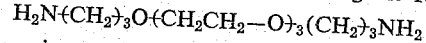

for five minutes at 25° C. A 1 gram portion of the composition was cast to a film 2 mils thick and cured to a tough film having excellent flexibility and excellent impact strength.

EXAMPLE 7

One hundred grams of diglycidyl ether of 2,2-bis-(p-hydroxyphenyl) propane having an epoxy equivalent weight of 195 were admixed with 34 grams of di-(3-aminopropyl)ether of dipropylene glycol having the formula:

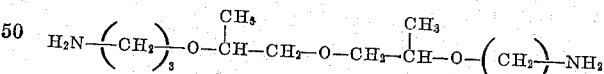

at room temperature, about 25° C. The composition was then cast into bars 8 inches by 1¼ inches by ¼ of an inch and the bars placed in a room which was at a temperature of about 25° C. and had a relative humidity of 100 percent. The bars were allowed to stand therein for 3 days. At the end of 3 days the bars were found to have cured to the infusible state without any haziness or cloudiness appearing at the surfaces thereof.

Properties of the molded bars:
Tensile strength (ASTM D–638)=7817 p.s.i.
Tensile modulus of elasticity (ASTM D–638)=0.358×10⁶ p.s.i.

Flexural modulus (ASTM D–790)=0.370×10⁶ p.s.i.
Izod Impact (ASTM D–256)=1.49 ft. lbs./inch The compositions of this invention, in addition to having utility as protective coatings and as castings to produce film, can also be used as adhesives, impregnants for fibers, as potting compositions, and can be roto-cast into hollow shaped articles, such as dolls, balls, and the like.

What is claimed is:
1. Curable composition comprising a polyepoxide hav- g an epoxy equivalency of more than one wherein the xygen of each epoxy group is attached to vicinal carbon toms and a liquid glycol diamine having the general formula:

$$H_2N(CH_2)_3O(C_nH_{2n}O)_x(CH_2)_3NH_2$$

wherein $n$ is an integer having a value of from 2 to 3 inclusive and $x$ is an integer having a value of 1 to 3 inclusive, said diamine being present in an amount sufficient to cure said composition to an infusible product.

2. Curable composition comprising a polyepoxide having an epoxy equivalency of more than one wherein the oxygen of each epoxy group is attached to vicinal carbon atoms and a liquid glycol diamine having the general formula:

$$H_2N(CH_2)_3O(C_nH_{2n}O)_x(CH_2)_3NH_2$$

wherein $n$ is an integer having a value of 2 to 3 inclusive and $x$ is an integer having a value of 1 to 3 inclusive, said diamine being present in an amount of from about 90 percent of stoichiometric to about 10 percent in excess of stoichiometric, the stoichiometry being based on the number of amino hydrogen atoms and epoxy groups of said composition.

3. Curable composition comprising a polyepoxide having an epoxy equivalency of more than one wherein the oxygen of each epoxy group is attached to vicinal carbon atoms and a liquid glycol diamine having the general formula:

$$H_2N(CH_2)_3O(C_nH_{2n}O)_x(CH_2)_3NH_2$$

wherein $n$ is an integer having a value of 3 and $x$ is an integer having a value of 1 to 3 inclusive, said diamine being present in an amount of from about 90 percent of stoichiometric to about 10 percent in excess of stoichiometric, the stoichiometry being based on the number of amino hydrogen atoms and epoxy groups of said composition.

4. A curable composition as defined in claim 1 wherein the polyepoxide is a polyglycidyl ether of a polyhydric phenol.

5. A curable composition as defined in claim 4 wherein the polyglycidyl ether is diglycidyl ether of 2,2-bis(p-hydroxyphenyl)propane.

6. A curable composition as defined in claim 2 wherein the polyepoxide is bis(2,3-epoxycyclopentyl)ether.

7. A curable composition as defined in claim 2 wherein the liquid glycol diamine is di(3-aminopropyl)ether of ethylene glycol.

8. A curable composition as defined in claim 2 wherein the liquid glycol diamine is di(3-aminopropyl)ether of diethylene glycol.

9. A curable composition as defined in claim 2 wherein the liquid glycol diamine is di(3-aminopropyl)ether of triethylene glycol.

10. A curable composition as defined in claim 2 wherein the liquid glycol diamine is di(3-aminopropyl)ether of dipropylene glycol.

11. The cured product of the composition defined in claim 1.

12. A curable composition as defined in claim 4 wherein the polyepoxide is diglycidylether of 2,2-bis(p-hydroxyphenyl)propane and the liquid glycol diamine is di(3-aminopropyl)ether of diethylene glycol.

References Cited by the Examiner
UNITED STATES PATENTS

| | | | |
|---|---|---|---|
| 2,723,241 | 11/1955 | De Groote et al. | 260—47 |
| 2,739,161 | 3/1956 | Carlson | 260—2 |
| 2,772,248 | 11/1956 | Lieberman et al. | 260—29.2 |
| 2,957,844 | 10/1960 | Wesp | 260—47 |
| 2,981,711 | 4/1961 | Meyer | 260—2 |
| 2,982,751 | 5/1961 | Anthes | 260—29.2 |
| 3,108,011 | 10/1963 | Frotscher | 260—2 |
| 3,148,199 | 9/1964 | De Groote et al. | 260—47 |

OTHER REFERENCES

Skeist, "Epoxy Resins," p. 29, Reinhold Pub. Corp., N.Y., 1958 (Copy NSL TP 986, E6 S52).

WILLIAM H. SHORT, *Primary Examiner.*

JOSEPH R. LIEBERMAN, *Examiner.*

H. BURSTEIN, T. D. KERWIN, A. LIBERMAN,
*Assistant Examiners.*